WHELPLEY & STORER.

Treatment of Ores.

PATENTED JUL 11 1871

116903

Witnesses:

Inventors:
James D. Whelpley
Jacob S. Storer 116,903

UNITED STATES PATENT OFFICE.

JAMES D. WHELPLEY AND JACOB J. STORER, OF BOSTON, MASSACHUSETTS.

IMPROVEMENT IN TREATMENT OF ORES BY MEANS OF FUEL, CHEMICALS, AND FLUXES.

Specification forming part of Letters Patent No. 116,903, dated July 11, 1871.

*To all whom it may concern:*

Be it known that we, JAMES D. WHELPLEY and JACOB J. STORER, of Boston, in the county of Suffolk and State of Massachusetts, have made a new and useful Improvement in the Treatment of Ores by Means of Fuel and Fluxes; and we hereby declare the following to be a full and exact description of the same, reference being had to the accompanying drawing which forms a part of this specification, and in which—

Figure 1:
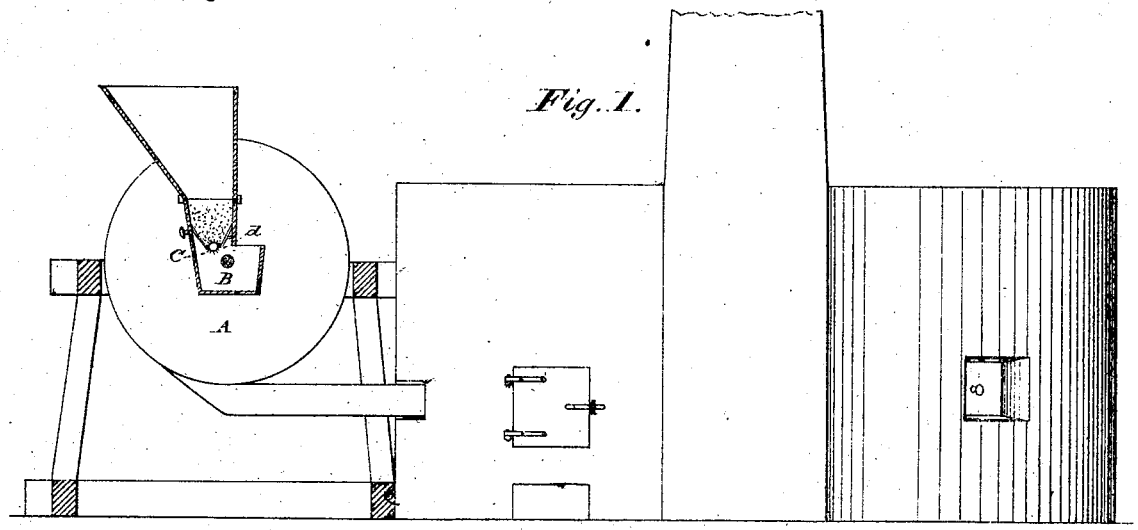
Figure 2:
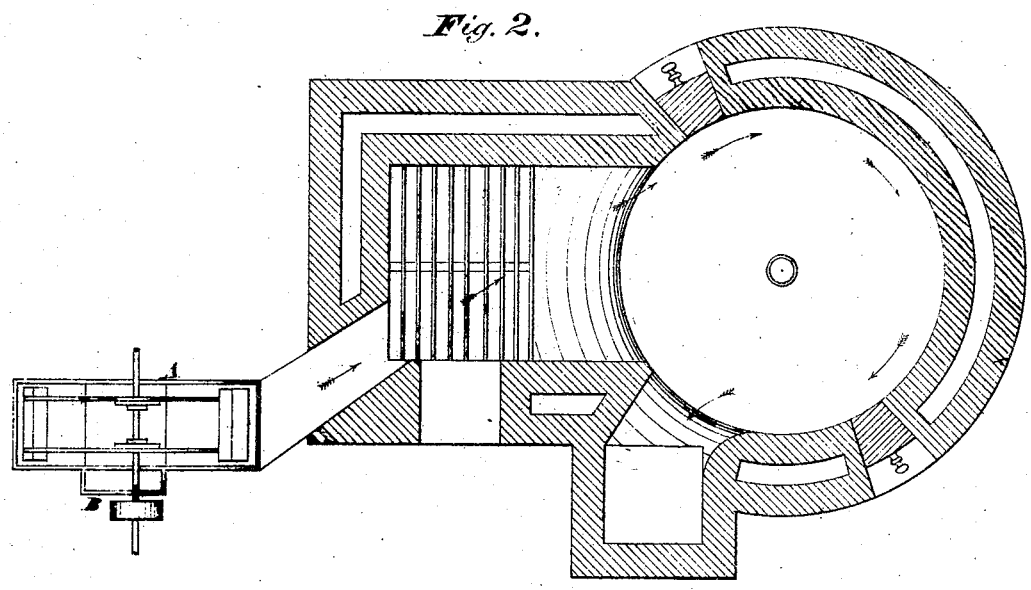
Figure 3:
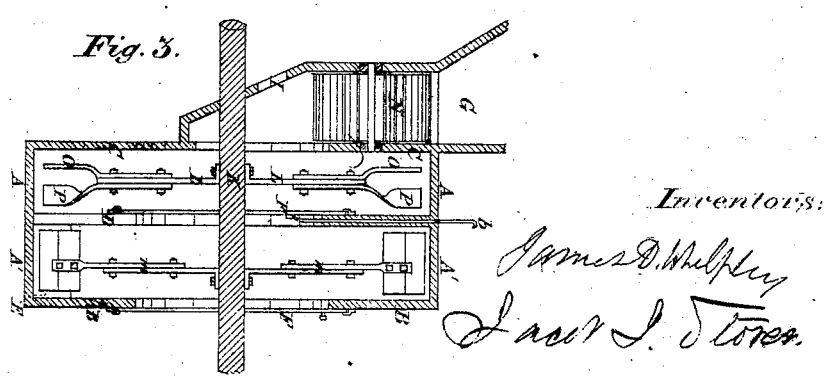

Figure 1 shows an elevation, partly in section; Fig. 2, a horizontal plan view and section; Fig. 3, a vertical section of a fan-mill for feeding ore, fuel, and fluxes into furnaces.

This invention relates to a novel application of fuel and of the fluxes or reducing agents used in metallurgic processes; and consists in employing fuel and fluxes in a finely-divided state, and feeding them into the air-blast of a furnace or fire-box, so that they may be floated on the blast during their consumption, and thus generate their heat and perform their reactions at the working-point, by this means giving great economy, more perfect results, and better control over the operation in which the fuel is employed. The invention is equally applicable to furnaces for metallurgic operations and to fire-boxes where the auxiliary blast is used. The reduction of metals from their ores by the "dry method" is effected by exposing them to heat either alone or in connection with carbon in combustion and auxiliary chemicals called fluxes or "reducing agents." Various staple chemicals are made by first obtaining a primary product, and then combining with it additional equivalents, or taking away superfluous equivalents by aid of heat and auxiliary chemicals. Whenever these auxiliary chemicals are used, or whenever incandescent fuel is used as an agent operating on other bodies by means of the products of combustion, it is important that every particle of the substance to be acted on should be brought into intimate contact with the auxiliary chemicals or incandescent carbon within a heated atmosphere. We propose to accomplish this result by blowing, fanning, or sifting among the ores or primary chemical products, while heated, the carbon and auxiliary chemicals in a finely-divided state, usually charging the air-blast of a furnace with them, but sometimes driving them in by steam, if that is desirable for the required reaction, or using a separate and distinct air-blast for the purpose. The latter mode is preferable, though not always absolutely necessary. We have sometimes introduced the finely-pulverized fuel, ores, and chemicals by sifting them into the furnace through an aperture; but this process is troublesome in large operations, and we consider it inexpedient, as sieves wear rapidly, and are easily destroyed or rendered unserviceable by the action of heat or of the chemicals on their wires. We therefore prefer the following better mode, illustrated by the drawing making a part of this specification:

We take an ordinary fan-blower, and close to the central opening of the case A, Figs. 1 and 2, by which air enters into it, we affix a hopper, B, having an automatic feed, consisting of a revolving cylindrical brush, C, and discharging-bar, *d*, against which the bristles of the brush strike to free themselves from the dust, which is thus scattered into the track of the air-blast. Into this hopper we place the coal, ore, and chemicals, which are thus regularly and sufficiently supplied to the air-blast. If convenience requires, the feed of material may be into the pipe leading from the fan-blower to the head of the furnace; but it is best to have the blower between the feed and the furnace. The fan should revolve rapidly and throw a swift and regular current of air, which will secure perfect suspension and distribution of the air-floated particles. It is evident that by this method of using fuel, coal of the most inferior quality, charged with sulphur and other foreign matters, can be used by mingling their powders with powdered lime and other reagents to correct the ill effect of their impurities, and, by taking care to have an abundant supply of oxygen to combine with these impurities, we can also utilize the waste and refuse of mines and coal-yards, which, because of their fineness, would not otherwise be employed. By adjusting the amount of fuel to the amount of air driven by the fan-blower the complete combustion of all the carbon is effected without difficulty. By placing in the axis of an Argand burner a blow-pipe with an apparatus feeding powdered charcoal into its air-blast we construct a lamp of great value for laboratory use or illumination. In burning massive fuel in the usual way, in a fire-box over grate-bars, a considerable percentage of heat is wasted by absorption into the brick-work of the fire-box. By our method this waste is avoided. In furnaces usually called gas-furnaces the receptacles for the fuel are used merely as generators for the production of combustible gases, and the fire-boxes may be, and in practice frequently are, removed to a considerable distance from the working-point, and thus the first equivalent of heat developed in the creation of the combustible gases is in great part lost. By our method of using fuel the gas itself is generated at the working-point, and the entire development of heat is utilized in the performance of work. If we desire the complete conversion of carbon into carbonic acid by having the supply of air slightly in excess, we secure that result, and all the heat is produced at the most desirable point; while, if we desire to produce inflammable gases, such as oxide of carbon, it is only necessary that the supply of floated carbon should be slightly in excess of the supply of oxygen. When the air carrying floated fuel enters a furnace it must be instantly heated to bring on combustion. To effect this it must be carried over a bed of ignited fuel in the ordinary fire-box of the furnace, so that it may mingle with the hot air, but after this process has gone on for a little while the walls of the furnace, becoming heated, will radiate heat enough to fire the particles of carbon as they enter upon the blast. The solid fuel in the fire-box is thus subordinated and becomes a mere auxiliary for the purpose of heating the air to promote aerial combustion, and the quantity of coal consumed in the fire-box will be proportionally small, and may be made constantly less as the walls of the furnace attain a higher temperature. The great metallurgic advantage of this use of fuel with or without the auxiliary chemicals is, that the combustion occurs and the heat is generated at the working-point, and precisely the same is true if the blast of a fire-box intended simply for the generation of heat is introduced over the top of the fire, and laden with finely-powdered coal. The aerial combustion takes place and the heat is generated at precisely the point most desirable to secure the greatest amount of work, and by thus reducing the ratio of wasted heat we secure an important economy.

If, in a reverberatory furnace intended for the reduction of ores, as shown in Figs. 1 and 2, we supply to a blast over the fire fuel in fine powder, and any required flux or reducing agent in similar powder, the carbon of the fuel of course becomes ignited, and the required action takes place under most favorable circumstances. If the substance to be acted on be also finely divided the result will be better. By regulating the supply of fine coal we can regulate the character of the flame produced, and make it an oxidizing or a reducing-flame at pleasure. Sulphur and phosphorus and other foreign elements may be removed from metals and ores by the use of alkalies, such as soda or potassa, or salts of the same, or alkaline earths, such as lime, as fluxes; and in an air-blast bearing coal in aerial combustion so contaminated the use of such air-borne fluxes, in connection with the impure coal, will render it as valuable for metallurgic purposes as the best of coal.

The drawing shows a plan and elevation (Figs. 1 and 2) of a reverberatory furnace intended for the redution of ores. The apparatus for the introduction of the ore, fuel, and fluxes or reducing agents is shown attached to the fan-blower of the auxiliary blast, and can readily be so attached at small expense. Fig. 3 is a cross-section of a machine devised for this purpose.

A A' are cylinders. B is a disk having a central air-feed, opened and closed at will by a register, F; and C is a disk having a central opening, into which enters a pipe from hopper G. This pipe has an air-feed hole, I, and contains a corrugated cylinder, N, nearly closing the bottom of the hopper G. A diaphragm, D, having a central opening, opened or closed by a register, F, operated by rod $f$, divides the interior of the chamber into a cutting or powdering-chamber and a fan-chamber. Through the axis of the cylinder passes shaft K, carrying disk L and fan-blower $m$. Disk L is larger than the openings in the disk C and diaphragm D, and acts as a spreader to air passing through the machine. It carries knives O and air-wheel paddles P, arranged alternately on its opposite faces, the knives being nearer the air and coal-feed than the paddles. On feeding bits of coal or other substances into the hopper when the machine is in motion they are regularly fed past cylinder N, are caught by the air-blast from I, pass into the cutting-chamber, are drawn down past the knives and paddles, and are there comminuted. When sufficiently fine to be floated they are drawn forward by the air-blast into the fan-blower, and thence discharged by exhaust-pipe E into the fire-box or furnace.

We do not claim forcing among massive fuel in combustion, by means of a cylinder or pressure-blower, the finely-powdered fuel and fluxes, for that is old and useless; but

What we claim as our invention, and desire to secure by Letters Patent, is—

1. The method of burning solid fuel in a finely-divided state, while floated on an air-blast, either alone or in connection with fluxes or reducing agents, to eliminate the impurities in the fuel or the substance to be treated, and the employment of the feeding apparatus described in connection with the fan-blower, or of the comminuting apparatus described, combined with a fan-blower, for the purpose of furnishing to the air-blast "floated fuel" for aerial combustion.

2. The process of treating ores with fluxes and chemical re-agents, by combining the ore and flux or re-agent in fine powder, and floating them into the furnace by means of an air-blast or steam-jet, substantially as described.

3. The apparatus shown in Figs. 1 and 2, consisting of a hopper with feeding device, a fan-blower, a flue or flues, and combustion-chamber, all substantially as shown.

4. The apparatus shown in Fig. 3, consisting of hopper G, feeding-cylinder N, and blast, so as to carry the fuel into the furnace, as described.

JAMES D. WHELPLEY.
JACOB J. STORER.

Witnesses:
CHARLES M. NICKERSON,
FRED. W. LONGLEY.